United States Patent [19]

Ziccarelli

[11] 4,042,721

[45] * Aug. 16, 1977

[54] FAST CONCHED CANDY COATING

[75] Inventor: Salvatore F. Ziccarelli, Downers Grove, Ill.

[73] Assignee: Beatrice Foods Co., Chicago, Ill.

[ * ] Notice: The portion of the term of this patent subsequent to Aug. 24, 1993, has been disclaimed.

[21] Appl. No.: 716,795

[22] Filed: Aug. 23, 1976

Related U.S. Application Data

[62] Division of Ser. No. 628,559, Nov. 3, 1975, Pat. No. 3,976,806.

[51] Int. Cl.$^2$ .......................... A23G 1/16; A23G 1/00
[52] U.S. Cl. .................................. 426/613; 426/631; 426/659; 426/660
[58] Field of Search ................. 426/613, 660, 519, 99, 426/103, 659, 631

[56] References Cited

U.S. PATENT DOCUMENTS

| 1,387,377 | 8/1921 | Fryer et al. | 426/519 |
| 2,356,181 | 8/1944 | Rubens | 426/613 |
| 2,459,908 | 1/1949 | Alikonis | 426/660 |
| 2,673,802 | 3/1954 | Hansen | 426/519 |
| 3,579,355 | 5/1971 | Wyss et al. | 426/576 |
| 3,976,806 | 8/1976 | Ziccarelli | 426/613 |

Primary Examiner—Jeanette M. Hunter
Attorney, Agent, or Firm—Murray and Whisenhunt

[57] ABSTRACT

A fast conched candy coating is prepared by heating fat to above the melting point thereof and mixing the fat with sugar, optionally with milk solids, emulsifiers, flavoring, cocoa or cocoa butter. The mixture is maintained above the melting point of the fat but below 150° F. The heated mixture is then conched in a high speed shearing and mixing device wherein the solid particles of the mixture are sheared to 40 microns or less and the mechanical energy imparted during the shearing and mixing raise the conching temperature to between 190° F and 250° F in less than 30 seconds.

7 Claims, 3 Drawing Figures

FAST CONCHED CANDY COATING

This is a division of application Ser. No. 628,559, filed on Nov. 3, 1975 and now U.S. Pat. No. 3,976,806.

The present invention relates to a method of fast conching a candy coating and to the coating which results therefrom. More particularly, the present invention relates to a method and coating which can be produced in a fraction of the time necessary for producing a conventionally conched compound coating for candies and the like.

BACKGROUND OF THE INVENTION

Many confectionaries are coated with a flavored candy coating. The coating helps to preserve the confectionary, imparts a desired eye-appeal and adds flavor. Bakery produced cakes, ice cream bars and popsicles, candy pieces and candy bars are conventionally coated with such flavored coatings. While these coatings can be flavored with any desired natural or artifical flavor, they are most often flavored with cocoa or cocoa butter to form a chocolate flavored coating.

Chocolate coatings can be produced in the traditional way of making milk chocolate. This process, however, requires a rather expensive ingredient, i.e. cocoa butter. For this reason and for other reasons, milk chocolate candy coatings are relatively expensive and are not used on popularly priced confectionaries and in lieu thereof a compound coating is used. Compound coatings do not require a cooking step and are, generally speaking, simply a mechanical mixture of, principally cocoa, sugar and fat.

As can be appreciated, the solid ingredients and the fat of a compound coating must be so intimately mixed that the texture, mouth feel and taste of the compound coating will approximate that of milk chocolate. The process wherein these ingredients are mixed to that required extent is referred to in the art as the conching step. As is well-known in the art, conching must pulverize the sugar, cocoa and other ingredients to the point that the compound coating has no "gritty" texture or mouth feel and to the extent that the cocoa is mechanically worked into the fat.

Traditionally, the conching step takes place on a "concher" which operates with rolling pressure to slowly grind and pulvarize the sugar, cocoa and other ingredients into the fat.

Also, during the conching step, the moisture content of the ingredients is reduced to very low levels, i.e., to one percent or less and more often to 0.5 percent or less. Water sensitive emulsifiers, such as lecithin, are added near the end of the conching step when the moisture content has been reduced to the range of these lower levels.

The time required to complete a conching step of the foregoing nature will depend upon the quality of the compound coating desired. For better compound coatings up to 80 to 85 hours on the concher are required and even for the very poor and generally unacceptable grades of compound coatings, at least 8 hours will be required. While this operation requires a minimum of supervision, it does require extended amounts of power and the long use of relatively expensive capital equipment. Accordingly, it would be most desired in the art to provide a method of conching which will considerably shorten the conching time, but which will provide the superior quality of long conching time compound coatings.

OBJECTS OF THE INVENTION

It is therefore an object of the invention to provide a method and compound coating wherein the conching step may be completed in a fraction of the time required for conventional conching and which conched compound coating will have properties at least equal to the long time conched compound coatings coventionally produced in the art. Other objects will be apparent from the following disclosure and claims.

THE DRAWINGS

BRIEF DESCRIPTION OF THE INVENTION

The present invention is based on three principal discoveries. Firstly, it has been discovered that by careful selection of the ingredients for compound coatings, it is possible to conch those ingredients at a fraction of the time required by conventional conching processes. Secondly, it has been discovered that those selected ingredients can be extremely quickly conched when the primary forces are shear forces, as opposed to compressive forces normally exerted by the rolling pressure of conventional conching machines. Thirdly, it was discovered that when using the careful selection of ingredients with the shear forces, relatively critical temperatures and times must be observed, or otherwise a satisfactory conching will not take place.

Thus, broadly stated, the present invention includes a process for producing a candy coating wherein 30 to 65 parts of fat are heated to a temperature above the melting point thereof. That melted fat is mixed with sugar and optionally milk solids or demineralized whey, emulsifiers, cocoa or cocoa butter and flavors. The temperature of this heated mixture is maintained at above the melting point of the fat but below 150° F. This heated mixture is then conched by a high speed shearing/mixing. The solid particles of the mixture are sheared by shearing forces having the major shear component at 75° or greater to produce sheared particles having at least one dimension of 40 microns or less. The mixing during the shearing operation must supply sufficient mechanical energy into the mixture so as to raise the conching temperature of the heated mixture to at least 150° F, but no greater than 220° F. The time for raising the mixture to this conching temperature must be no greater than 30 seconds and during this shearing/mixing time, the moisture content of the conched mixture must be reduced to one percent or less. Thereafter, the conched mixture is quickly cooled to less than 180° F.

The ingredients may be chosen so as to provide the essential taste of a conventional cocoa compound coating, i.e., fat, sugar, cocoa, milk or demineralized whey solids, emulsifiers, and flavors. A coating similar to a chocolate coating may be produced with butter fat and cocoa butter in lieu of part of the cocoa or, the coating may be similar to a conventionally artificially flavored compound coating, such as banana, cherry, etc., wherein larger amounts of fat and sugar are used, but additionally an artificial flavor is used in lieu of the cocoa or cocoa butter.

DETAILED DESCRIPTION OF THE INVENTION

Figure 1:
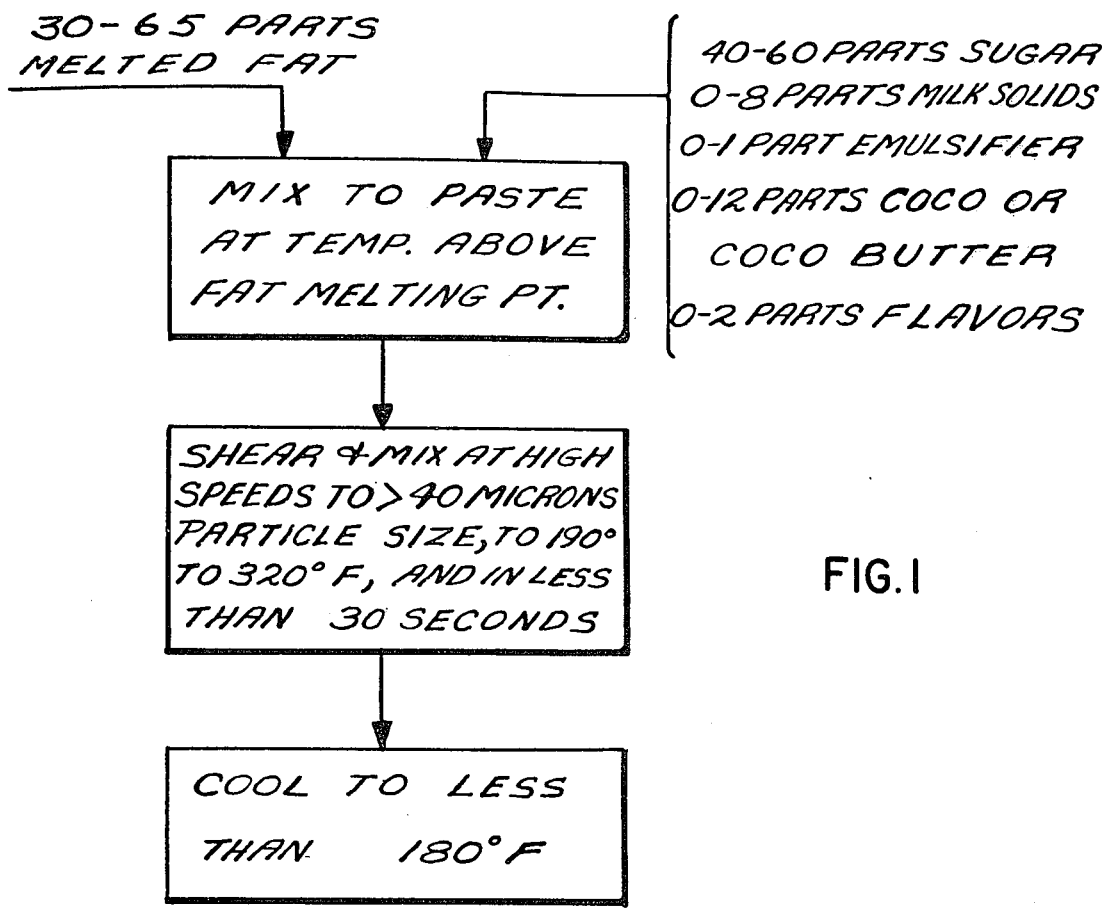
FIG. 1 shows in block, diagrammatic form the essential steps of the process to produce the candy coating.

As shown in FIG. 1, the essential steps of the process are forming a paste of the melted fat and the dry ingredients and feeding that paste to a high speed shear mixing machine to reduce the particle size of the solids in the paste to less than 40 microns and to raise the temperature of the paste from 190° to 220° in a very short time, i.e., less than 30 seconds. Thereafter, the conched coating mixture is cooled to prevent deterioration thereof at the higher temperatures. Of course, ultimately, the conched coating will be used to coat candy.

The mixing may take place in any desired type of mixing device, but a scraped wall heated mixing device is a preferred form of the invention, since this continually removes the ingredients from the walls where heat transfer takes place and prevents local over heating of the ingredients during this initial mixing process. Many apparatus suitable for such operation are known in the art and include heated ribbon blenders, swept wall heat exchangers, sigma blade mixers and the like. A particularly convenient apparatus for this purpose is manufactured by the LITTLEFORD Company and model FKM and model KM are particularly suitable in this regard.

Irrespective of the kind of mixer used to mix the melted fat and dry ingredients, mixing must be continued until a flammable slurry, referred to hereafter as a "paste" is formed. In a high speed conching operation of the present nature, the incoming feed must be homogenous in nature, i.e., a portion of the initial feed must have essentially the same distribution of ingredients as a latter portion of the feed. Otherwise, the conching will not be uniform in such a short period of time. The paste need not be a permanent slurry or suspension, and it is only required that the paste uniformly distribute the dry ingredients for time sufficient to feed that paste to the conching mechanism. Generally speaking the paste should be stable for at least three to four minutes, but more usually, the paste will be stable for several hours or more (i.e., no substantial settling of the solids will take place within the foregoing time periods).

The heated paste mixture should be maintained at a temperature above the melting point of the fat. Otherwise, the paste will congeal or solidify. In the present process, the feed must be in fluid form, as opposed to the conventional concher where part of the feed could be in solid form. Under the circumstances, if the paste is allowed to solidify and then reheated, the chances of nonuniformity of solids distribution greatly increases.

On the other hand, if the temperature of this mixture exceeds about 190° F, the chances of undesired deterioration of the fat or cocoa or other flavors substantially increases. Additionally, the sugar may slowly change in undesired character. For improved safety in this regard, it is preferred that the temperature be maintained at less than 140° F, and more preferably less than 120° F.

The heated mixture is then passed to the conching operation. As noted above, the conching step must cause sufficient shearing and mixing of the heated paste mixture so that the average particle size of the solids is reduced to less than 40 microns. Preferably, the average particle size is reduced to 35 microns or less and more preferably, less than 30 microns. A satisfactory range is between 20 and 30 microns. It should be appreciated, however, that only one dimension need be reduced to this low level, and the other two dimensions can exceed this dimension, so long as the other two dimensions do not exceed this lower dimension by more than a factor of five, preferably no more than a factor of three.

The shearing and mixing during the conching step must rapidly heat the heated paste mixture to a temperature of 190° F to 220° F. This temperature must be reached within 30 seconds, since a slow increase in temperature will require too long of a dwell at the elevated temperatures, i.e., as the temperatures approach 190° F. Such extended dwell at temperatures approaching 190° F will cause undesired and unacceptable properties in the conched mixture. Therefore, the minimum temperature of 190° F must be very rapidly obtained.

In this latter regard, heating the mixture during the conching operation by heat transfer is too slow to accomplish the rapid temperature rise which is necessary. As the mixture conches, heat transfer is severely reduced between the heat transfer surface and the mixture, due to the pasting out and coating of heat transfer surfaces. To accomplish the rapid temperature increase it is necessary that the temperature rise be mechanically accomplished. In this regard, the term "mechanically" means that mechanical energy is converted to heat in the mixing by virtue of friction, shear and the like generated during the conching operation. This does not mean, however, that no heat may be added by heat transfer. It does mean, however, that the major amount of heat is generated by the mechanical energy input.

In order to accomplish a conching in such a short time, it is necessary that the conching forces be essentially shear forces, as opposed to compressive forces which are the majority forces in the standard concher of the prior art conching operation. These shear forces can be best understood in connection with FIGS. 2 and 3. Those FIGURES. show an apparatus, in diagrammatic form, suitable for carrying out the present invention. This apparatus, however, is well known to the art and is commercially available. Accordingly, the details of the apparatus will not be presented in order to retain conciseness in this specification. Indeed, reference to this particular apparatus is by way of illustration to, primarily, explain the principle involved, rather than a criticality in the apparatus per se.

Figure 2:
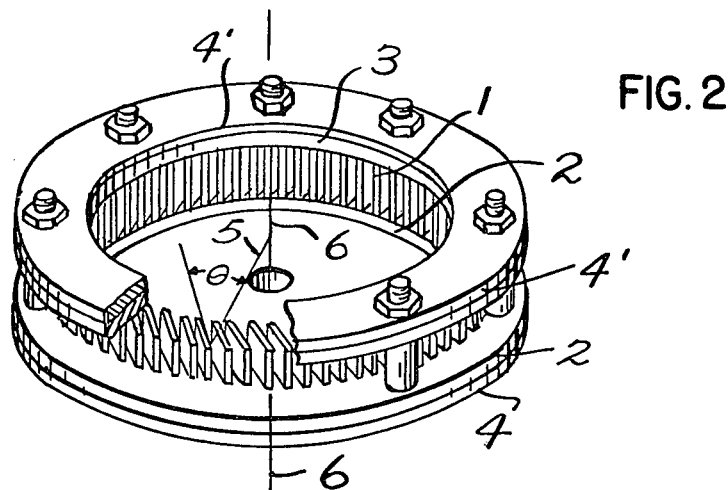
FIG. 2 shows in diagrammatic form the blade assembly of an apparatus suitable for carrying out the present process.
Figure 3:
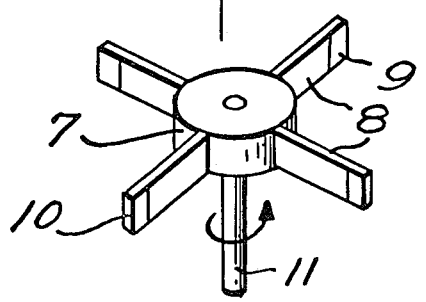
FIG. 3 shows an impeller for use in the assembly of FIG. 2.

FIG. 2 shows a series of blades 1 which are held in position by lower blade holding ring 2 and an upper blade holding ring 3. A lower retaining ring 4 and an upper retaining ring 4' complete this blade assembly. The blades are spaced apart a small distance, i.e., between 0.005 and 0.3 inch, depending upon the particle sizes of the solids in the paste to be conched, the feed rates, the temperature of the paste, and the rate of feed. Generally, however, the blades are spaced apart about 0.15 inch. The blades are set near radii 5 generating from axis 6. The blades are actually offset from the radius by an angle $\theta$ (exaggerated in the drawing for illustration purposes). This angle will induce at least some shear component which is less than 90°, for the reasons explained more fully hereinafter.

An impeller 7 has impeller arms 8 which carry an impeller surface 9. The outermost ends of the impeller surface have a square shear surface 10. The impeller rotates on shaft 11 which is in mechanical communication with a power source (not shown).

The impeller fits within the array of blades in FIG. 2 and the distance between the shear surface 10 and the blades is very small (i.e., between 0.1 and 0.01 inch). As the impeller shaft rotates, the impeller, which is mechanically fixed thereto, also rotates. The heated paste is fed into the rotating impeller and is impelled outwardly toward the blades. As the paste contacts the blades, a shear force, in the direction of rotation, is created between the blades and the shear surface. Solid particles are therefore, sheared between the blades and the impeller in such a manner that the particles are cut or sliced rather than ground or crushed as was the prior art technique with conventional conchers.

It has been found, however, that if the average shear component is 90° ($\theta$ equal 0) then undesired heating may take place between the shear surface in the blades and in extreme cases can cause caramelizing of the sugar. Therefore, the average shear component is preferably less than 90°, although that shear component can very closely approach 90° with impunity. It appears that the undesired heating takes place only when the 90° shear component is very closely approached. Thus, the average shear component should be at least 75° in order to insure that proper shearing takes place, but preferably the average shear component will be between 85° and 89.9° and more preferably, between 87° and 89.5°. A preferred average shear component is 89° ($\theta = 1°$).

Since the temperature must be raised extremely rapidly, the feed input to the conching device must be adjusted so that with mixing, shearing and extrusion of the conched mixture between the blades, sufficient mechanical energy is generated to raise the conching temperature to 190° to 250° F in less than 30 seconds. It is preferred, however, that these temperatures be between 200° and 240° F. And optimum temperatures are between 210° and 230° F. Additionally, since the longer periods of dwell at these temperatures give rise to greater possibilities of undesired overheating, it is preferred that the conching temperature be maintained for less than 15 seconds, and more preferably less than 10 seconds. Accordingly, by adjusting the feed to have this short dwell time in the conching device and by allowing the conched mixture to contact ambient temperatures after exit from the conching device, the short dwell time at the elevated temperatures can be achieved. In any event, the conched mixture should be rapidly cooled to below 185° F. In order to prevent undesired affects and more preferably cooled to less than 175° F. To avoid any overheating, this cooling should take place in less than 10 minutes and more preferably in less than 5 minutes.

During the conching operation, the moisture content, by virtue of the high temperatures, will be reduced to one percent or less. More preferably, however, the moisture content will be 0.5 percent or less and moisture contents as low as 0.2 to 0.3 percent are preferred.

With the foregoing process, various compositions may be conched. Thus, 30 to 25 parts of fat, 45 to 55 parts of sugar, 4 to 12 parts of cocoa, and 3 to 8 parts of milk solids or demineralized whey solids produce compound coating. Preferably, that coating will also include 0.1 to 0.8 parts of emulsifier, such as lecithin, and from 0.1 to 2 parts of flavors, such as salt, vanilla, etc.

Alternately, 30 to 35 parts of butter fat, 45 to 55 parts of sugar and 4 to 12 parts of cocoa butter will produce a coating which is very similar to milk chocolate. Hereagain, it is preferred that that composition includes 0.1 to 0.8 parts of emulsifier, such as lecithin, and from 0.1 to 2 parts of flavoring, again such as salt and vanilla.

Alternately, fruit flavors and other flavor coatings may be produced. In this connection 30 to 65 parts of fat, 40 to 60 parts of sugar and 0.1 to 2 parts of artificial flavor will be used, and again 0.1 to 0.8 parts of emulsifier and 3 to 8 parts of milk or whey solids may be used.

The sugar used in the process may be conventionally granulated sugar, although it is preferred that micro sugar be used. This is prepulvarized sugar which has a particle size of approximately 20 microns. The prepulvarized sugar, of course, reduces the amount of shearing that must take place during the conching operation. In this regard, the prepulvarized sugar should have a particle size of no greater than 100 microns and preferably no greater than 50 microns, although prepulvarized sizes up to 40 microns may be conveniently used.

The invention will be illustrated by the following examples, although the invention is not limited thereto and is fully applicable to the foregoing disclosure. In the specification, the following examples and claims, all percentages and parts are by weight, unless otherwise indicated.

EXAMPLE 1

Thirty-three parts of hard butter, having a melting point of 98°–101° F, was heated in a steam jacketed mixing tank to 106° F. The melted fat and the following solid ingredients were placed in a LITTLEFORD FKM-6000 mixer: 8.19 parts of cocoa; 51 parts of microsugar (average particle size of 20 microns); 5 parts of non-fat milk solids; 0.4 parts of lecithin; and 0.41 parts of flavors (vanilla and salt). The fat and solids were mixed until a smooth paste was obtained. The temperature during the mixing was maintained at about 110° F.

The heating mixture was conched by feeding the mixture to an URSCHEL COMITROL 1250 high speed shearing and mixing machine. The blades were set at 1° (89° shearing). The feed of the mixture and the rotation of the impeller was adjusted until the average particle size of the solids in the conched mixture was about 25 microns, the conching temperature of the mixture in the machine was about 220° F, the mixture remained in the machine for between 4 and 8 seconds and the moisture content of the conched mixture was about 3%.

The conched mixture cooled immediately on exiting the machine by ambient air to about 175° F in about 3 minutes.

The mixture was pumped to a holding tank and used to coat caramels, i.e., MILK DUDS and a taffy/nut CLARK candy bar. The resulting coating was at least equal in taste, mouth-feel and shelf properties to conventional compound coating.

EXAMPLE 2

Example 1 was repeated except that 60 parts of microsugar was used and the cocoa was replaced by 0.4 parts of artificial banana flavor. 0.1 parts of USDA yellow No. 5 was also used.

The resulting product was the same as Example 1 except that it had a banana flavor rather than a chocolate flavor.

What is claimed is:

1. A conched candy coating composition comprising the ingredients of:
    a. 30 to 65 parts fat; b. 40 to 65 parts sugar; c. 0 to 8 parts milk and or whey solids; d. 0 to 1 part emulsifier; e. 0 to 12 parts cocoa; f. 0 to 2 parts flavor; wherein the ingredients have been heated to at least 150° F and mixed to a conched form by a high speed shearing and mixing wherein the shearing is by shear forces having an average shear component of 75° or greater, the particle sizes of solids in the composition are 40 microns or less and the conching time has been 30 seconds or less and thereafter cooled to prevent deterioration thereof.

2. The product of claim 1 wherein the ingredients are: 30 to 35 parts fat; 45 to 55 parts sugar; 4 to 12 parts cocoa; and 3 to 8 parts milk and/or whey solids.

3. The product of claim 1 wherein the ingredients also include: 0.1 to 0.8 parts emulsifier and 0.1 to 2 parts flavors.

4. The product of claim 1 wherein the ingredients are: 30 to 35 parts butterfat; 45 to 55 parts sugar; and 4 to 12 parts cocoa butter.

5. The product of claim 1 wherein the ingredients also include 0.1 to 0.8 parts emulsifier and 0.1 to 2 parts flavor.

6. The product of claim 1 wherein the ingredients are: 30 to 65 parts fat; 40 to 60 parts sugar; and 0.1 to 2 parts flavors.

7. The product of claim 1 wherein the ingredients also include 0.1 to 0.8 parts emulsifier and 3 to 8 parts milk and/or whey solids.

* * * * *